Figure 1:
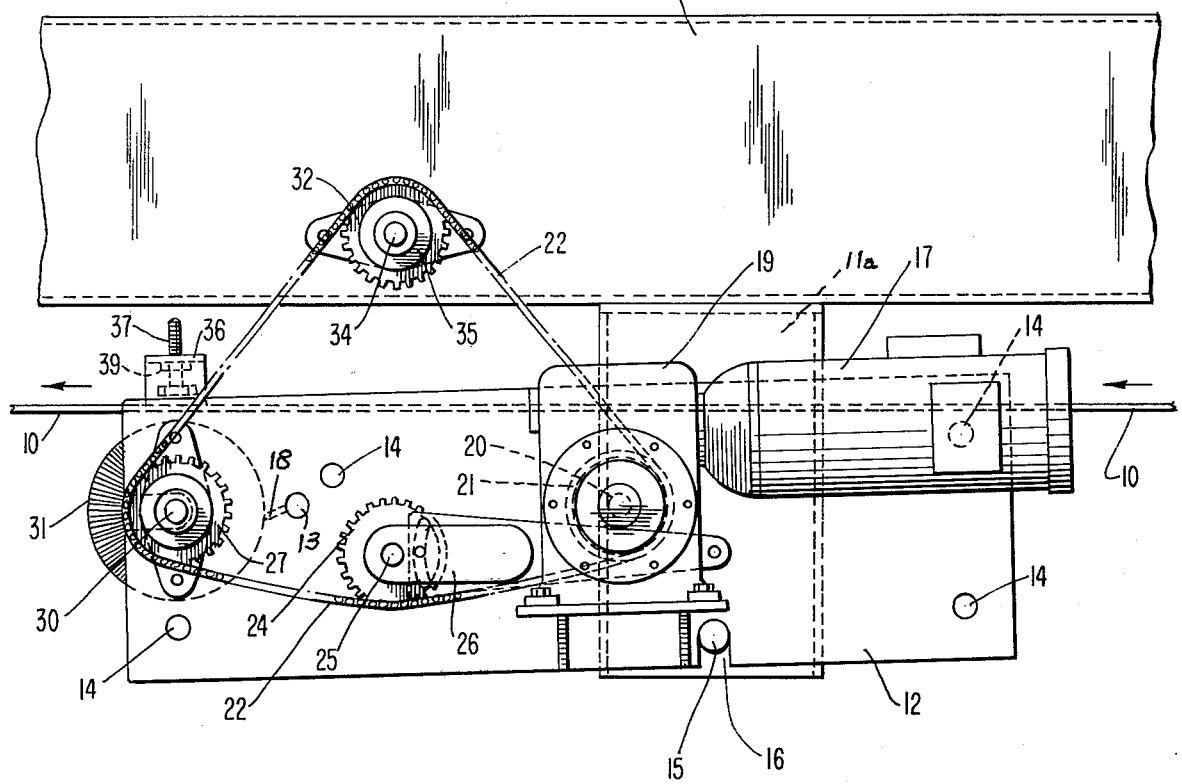

United States Patent [19]
Enchelmaier

[11] 3,957,155
[45] May 18, 1976

[54] CONVEYOR CLEANING DEVICE
[76] Inventor: Harvard W. K. Enchelmaier, 4 E. Greenbrook Road, North Caldwell, N.J. 07006
[22] Filed: May 29, 1975
[21] Appl. No.: 581,725

[52] U.S. Cl. ............................... 198/230; 15/21 D; 15/77
[51] Int. Cl.² ........................................ B65G 45/00
[58] Field of Search .............. 198/229, 230; 74/230; 15/21 D, 40, 77, 102

[56] References Cited
UNITED STATES PATENTS

| | | | |
|---|---|---|---|
| 766,013 | 7/1904 | Baldwin | 198/230 |
| 1,441,841 | 1/1923 | Fink | 198/230 X |
| 2,083,864 | 6/1937 | Puckett | 198/230 |
| 2,537,675 | 1/1951 | Klein | 15/77 |
| 2,815,520 | 12/1957 | Schanz | 15/40 |

FOREIGN PATENTS OR APPLICATIONS

| | | | |
|---|---|---|---|
| 1,093,,283 | 6/1967 | United Kingdom | 198/230 |

Primary Examiner—John J. Love
Assistant Examiner—Richard K. Thomson

[57] ABSTRACT

Device for cleaning a side of a continuous or apron-type conveyor as it travels. The frame of the conveyor cleaner is in the form of a first-class lever, a transversely disposed cylindrical brush being journalled on the frame adjacent the end of one arm thereof, driving mechanism for rotating the brush being mounted upon the frame. The device is balanced about its pivotal axis in such manner that the end of the device on which the brush is located is somewhat heavier than the part of the mechanism of the other arm of the device. Thus the brush naturally tends to fall when the cleaning device is not in operation. The cleaning device includes means for automatically pivoting the device about its axis so that the brush rises into contact with the lower surface of the lower run of the conveyor when the device is activated, the brush, as above-stated, automatically falling away from the conveyor belt when the device is deactivated. By changing the balance characteristics of the cleaning device, it can be utilized to clean the top of a conveyor.

9 Claims, 3 Drawing Figures

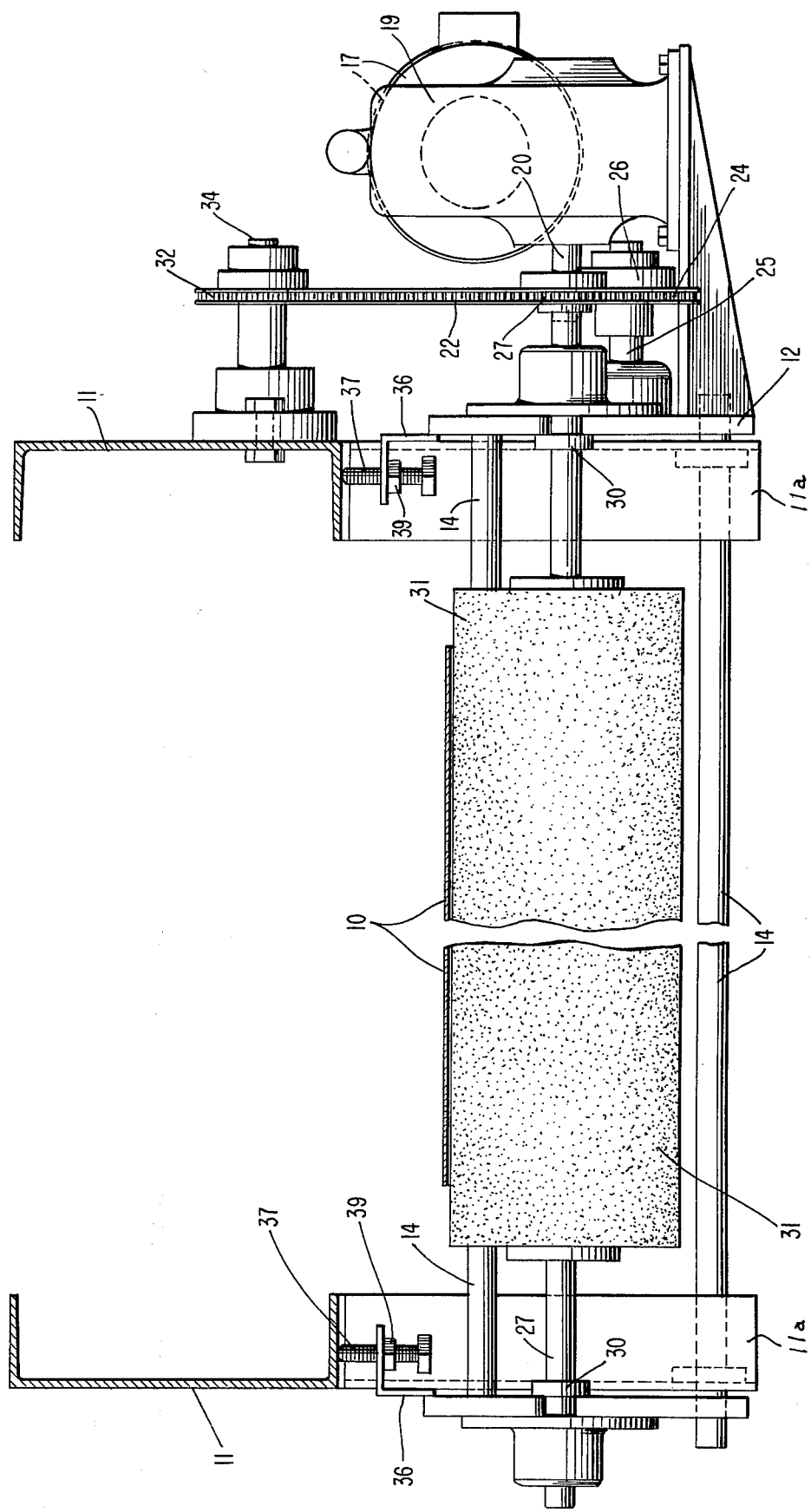

CONVEYOR CLEANING DEVICE

This invention relates to a device for cleaning a continuous or apron-type conveyor. More particularly, the invention relates to a conveyor cleaning device of the type indicated, such device including a transversely disposed rotatable cylindrical brush, wherein the brush is automatically moved into engagement with the surface of the conveyor to be cleaned when the device is activated, and the brush is automatically moved out of engagement with the conveyor when the device is deenergized.

Moving apron conveyors, that is, continuous conveyor belts, have been cleaned in the past by cleaning devices including rotating brushes which have been pushed into engagement with the conveyor belt to do the cleaning job. The brushes in such cleaning devices work very well until they have been stopped one or two times, and take a set by reason of the pressure of the bristles of the brush against the surface of the conveyor. When this occurs, when the cleaning device is again started, the set in the brush bristles does not come out and causes a thumping action which eventually destroys either the belt or the brush.

The conveyor cleaning device of the present invention is so constructed and arranged that the brush is in contact with the conveyor belt only after the driving means for the belt has been initiated. When the motor drive or other type of drive for the brush has been deenergized, the brush is automatically disengaged from the conveyor, thereby preventing the bristles of the brush from assuming a set.

The illustrative preferred embodiment of the device of the invention cleans the underside of the conveyor belt. The brush is mounted on a frame in the form of a lever which pivots about an axis transverse to the direction of travel of the conveyor belt. When the driving means for the brush is energized, the brush is automatically elevated into forcible contact with the surface of the conveyor belt to be cleaned. The driving means for the belt is so constructed and arranged as to allow the cleaning device to fall away from the belt when the driving means for the belt has been deenergized, thus causing the brush to be in a free state.

The invention will be more readily understood upon consideration of the accompanying drawings forming a part of the disclosure.

Figure 2:
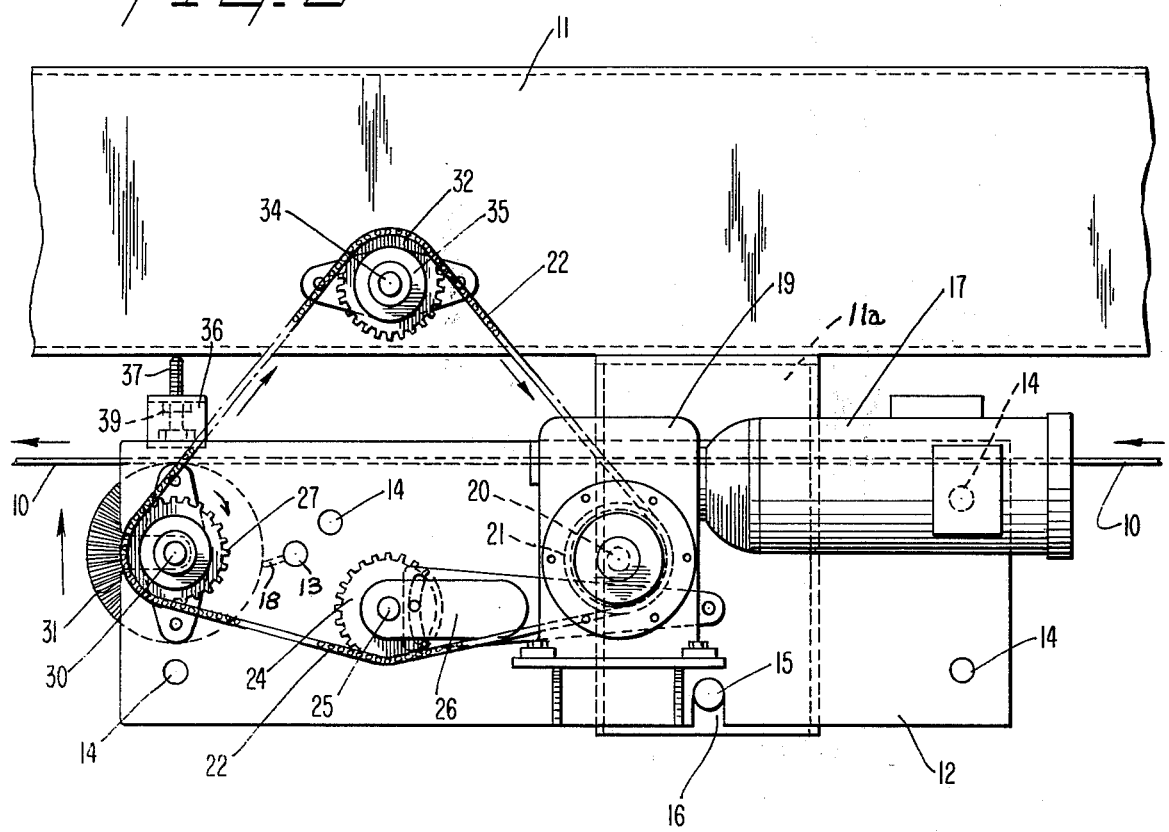

In the drawings:

FIG. 1 is a view in side elevation of the illustrative conveyor cleaning device of the invention, the device being shown in inoperative position with its brush-carrying frame pivoted downwardly to free the brush from engagement with the conveyor belt;

FIG. 2 is a view similar to FIG. 1 but with the brush cleaning device in operative position with the brush mounting frame elevated to bring the brush into engagement with the surface of the belt conveyor to be cleaned; and FIG. 3 is a view in end elevation of the brush cleaning device, the run of the belt conveyor being cleaned being shown in cross-section, the view being taken in the direction from left to right in FIG. 2.

A belt conveyor having a lower run 10 of the belt travelling in the direction from right to left in FIGS. 1 and 2 is supported on a plurality of transverse rollers (not shown). Such belt supporting rollers are journalled in opposed parallel longitudinal frame members made up of a lower member 11a and an upper member 11 as shown in FIG. 3. The belt cleaning device has a frame made up of two similar laterally spaced main side plates 12 which are connected in spaced parallel relationship by a plurality of cross-rods 14. As shown in FIG. 3, the thus-formed frame has the main side plates 12 thereof disposed laterally outside the respective lower frame members 11a. The frame of the conveyor cleaning device is pivoted upon a cross-rod 15 which extends between and is secured to the opposite lower frame members 11a of the conveyor. The outer ends of the cross-rod 15 extend beyond such lower frame members 11a, the protruding ends of such cross-rod being received within aligned slots 16 in the opposite main side plates 12 of the conveyor cleaning device so that the frame of the device is pivoted upon the cross-rod 15 and forms, in effect, a first-class lever.

A conveyor cleaning brush 31 is journalled on the left-hand end of the frame of the device as it is shown in FIGS. 1 and 2, the brush being cylindrical in form and mounted with its axis disposed transverse to the direction of travel of the run 10 of the belt of the conveyor. A gear reducer 19 is mounted upon the frame of the device near but to the left of (FIGS. 1 and 2) the cross-rod 15. An elongated electric motor 17 is mounted upon the gear reducer 19 and extends rearwardly (to the right) therefrom. As shown in FIG. 3, the gear reducer 19, the motor 17, and the driving means now to be described are mounted upon a bracket 23 secured to the right-hand main guide plate of the conveyor cleaning device.

The gear reducer 19 has a driving or output shaft 20 to which there is secured a first main output sprocket 21. A driving chain 22 is entrained over a spring-biased chain pivoted about tensioning sprocket 24 mounted upon a shaft 25 supported in a sub-frame 26. Elements 24, 25 and 26 are of known, conventional construction. Beyond the tensioning sprocket 24, the chain 22 extends to the left around a second main sprocket 27 which is secured to a shaft 29 upon which the brush 31 is mounted. Shaft 29 is journalled in opposed pillow blocks 30 secured to the respective main side plates 12 of the conveyor cleaning device.

After passing partially about the sprocket 27, the driving chain 22 travels upwardly to pass partially about a third main, upper sprocket 32, from which it travels downwardly to return to the driving sprocket 21. The sprocket 32 is mounted upon a shaft 34 which is journalled in a pillow block 35 affixed to the right-hand conveyor side frame member 11 as it is shown in FIG. 3.

The slots 16 are so located longitudinally of the main side plates 12 of the frame of the conveyor cleaning device that the end of the unit which mounts the brush 31 is heavier than the end of the frame which mounts the brush driving motor 17. Thus the end of the frame shown at the left in FIGS. 1 and 2, being the heavier, naturally tends to fall. The amount of this fall of the frame is restricted by the length of the driving chain 22 and the amount of tension on the spring-biased tensioning sprocket 24.

A flicker bar 18 is mounted on a cross rod 13 disposed parallel to the axis of the brush. The flicker bar extends into the face of the brush on a slight angle throughout the length of the brush. The flicker bar serves two distinct purposes.

The first, primary purpose is to generate some drag on the brush as it is rotating. This drag is essential since, in the illustrative embodiment, all of the sprockets which are not driven are ball bearing mounted and may not create a drag sufficient to pull the brush end of the conveyor into operating position. The drag of the flicker blade creates a restraining force against this motion to ensure the pulling of the brush end of the conveyor into operating position against the conveyor belt.

Preferably, the knife-like flicker blade 18 projects into the brush only about one-eighth of an inch; this ensures that the flicker bar does not create a set in the brush itself.

The second important function of the flicker bar is to ensure that particles which have been picked up by the brush in the process of brushing the conveyor belt will be removed from the brush. The flicker blade causes a flicking action which causes the particles which have clung to the brush to be flicked off, and of course, deposited below.

When the motor 17 is energized to start it up, thereby pulling the chain 22 in the direction of the arrows, the frame of the cleaning device is pulled upwardly by the driving sprocket 21 through the length of the chain which extends over the brush driving sprocket 27 and over the sprocket 32 which is journalled on the frame of the conveyor. This causes the left-hand end of the frame of the cleaning unit (FIGS. 1 and 2) to rise to bring the bristles of the brush 31 into contact with the lower surface of the run 10 of the conveyor belt. The upper terminal position of the left-hand end of the frame of the cleaning device is defined by the adjustment of stop screws 37 which are threadedly engaged with holes through the upper horizontal leg of the respective brackets 36 which are secured to the upper portions of the main side plates 12. Stop screws 37 are secured in adjusted position by lock nuts 39. When the upper ends of the stop screws 37 engage the lower flange of the respective side frame members 11 of the conveyor, the upward pivotal movement of the frame of the cleaning device is terminated. After the conveyor has been cleaned, the motor 17 is deenergized. Thereupon the weight of the front (left, FIGS. 1 and 2) end of the cleaning unit causes such end of the unit to overbalance the other unit thereof, thus pulling the brush away from the conveyor belt.

Although the above-described and illustrated embodiment of the brush of the invention is driven by a separate driving means, including an electric motor and gear reducer, other means may be employed to drive the brush in accordance with the invention. Thus the cleaning unit can be driven by means of a countershaft and an external chain drive from the main drive of the pulley, or it may be driven by any other suitable source which supplies the proper rotation to such driving means.

By changing the balance characteristics of the cleaning device, it can be utilized to clean the top of a conveyor. When the cleaning device works on the top surface of the conveyor, the brush end is made lighter, so that the brush tends to rise when the cleaning device is not in operation, and falls when it is placed in operation.

What is claimed is:

1. A device for cleaning a side of one of the runs of a continuous belt conveyor as it travels, comprising a frame in the form of a first-class lever extending generally parallel to the direction of travel of the belt and mounted adjacent the said run of the belt on pivot means having its axis transverse to the direction of travel of the belt, a cylindrical belt cleaning brush mounted on a shaft journalled on one end of the frame to rotate on an axis transverse to the direction of travel of the belt, and means selectively to drive the brush, the last-named means being so constructed and arranged that the frame pivots to bring the brush into contact with the said side of the belt when the brush driving means is energized and pivots in the opposite direction to remove the brush from contact with the belt when the brush driving means is deenergized.

2. A device in accordance with claim 1, wherein the brush is mounted at the outer end of a first arm of the frame, and the pivotal axis of the frame is so located with respect to the center of gravity of the frame and the elements mounted thereon that the end of the frame mounting the brush tends naturally to move away from the said side of the belt when the cleaning device is not in operation.

3. A device according to claim 1, wherein the said side of the belt to be cleaned is the underside thereof, and the frame of the cleaning device is mounted beneath the lower run of the belt.

4. A device according to claim 3, wherein at least a part of the means for driving the brush extends beyond the pivotal axis of the frame toward the outer end of the other arm of the frame.

5. A device according to claim 4, wherein the means for driving the brush includes a driving shaft disposed parallel to the pivotal axis of the frame, a driving pulley affixed to the driving shaft, a second pulley mounted on the brush mounting shaft, an idle third pulley mounted on fixed structure above and between the first, driving pulley and the second pulley, an endless driving belt entrained over the first, second, and third pulleys in that order, and a spring-biased belt tensioning means disposed to tighten the driving belt, the first pulley being driven in such direction as to pull upwardly the run of the driving belt extending from the second pulley to the third pulley when the brush driving means is energized.

6. A device as claimed in claim 5, wherein the driving belt is a chain, and the first, second and third pulleys are sprockets.

7. A device as claimed in claim 5, wherein the belt-tensioning means is disposed to engage the run of the belt between the first and second pulleys.

8. A device according to claim 5, comprising means which engages the brush to impose a drag thereon when it is driven, whereby to pull the brush into engagement with the side of the conveyor belt to be cleaned.

9. A device according to claim 8, wherein the means engaging the brush is a brush cleaning flicker bar extending generally parallel to the axis of the brush.

* * * * *